US012573311B2

(12) United States Patent
Doshi

(10) Patent No.: US 12,573,311 B2
(45) Date of Patent: Mar. 10, 2026

(54) SMART E-LEARNING SYSTEM USING ADAPTIVE VIDEO LECTURE DELIVERY BASED ON ATTENTIVENESS OF THE VIEWER

(71) Applicant: Payal Doshi, Pune (IN)

(72) Inventor: Payal Doshi, Pune (IN)

( * ) Notice: Subject to any disclaimer, the term of this patent is extended or adjusted under 35 U.S.C. 154(b) by 197 days.

(21) Appl. No.: 18/558,114

(22) PCT Filed: Apr. 15, 2022

(86) PCT No.: PCT/IN2022/050362

§ 371 (c)(1),
(2) Date: Oct. 30, 2023

(87) PCT Pub. No.: WO2023/002496

PCT Pub. Date: Jan. 26, 2023

(65) Prior Publication Data

US 2024/0203281 A1    Jun. 20, 2024

(30) Foreign Application Priority Data

Jul. 18, 2021    (IN) .............................. 202121032292

(51) Int. Cl.
| | |
|---|---|
| *G09B 5/06* | (2006.01) |
| *G06F 3/01* | (2006.01) |
| *G06V 40/16* | (2022.01) |
| *G09B 7/08* | (2006.01) |
| *H04N 21/234* | (2011.01) |

(52) U.S. Cl.
CPC ............. *G09B 5/065* (2013.01); *G06F 3/013* (2013.01); *G06V 40/174* (2022.01); *G09B 7/08* (2013.01); *H04N 21/23424* (2013.01)

(58) Field of Classification Search
CPC ......... G09B 5/065; A61B 5/165; A61B 5/168
See application file for complete search history.

(56) References Cited

U.S. PATENT DOCUMENTS

| | | | | |
|---|---|---|---|---|
| 10,013,892 | B2 * | 7/2018 | Aslan | ........................ G09B 5/08 |
| 2015/0213725 | A1 * | 7/2015 | Huntley | ................ G16H 30/20 |
| | | | | 345/156 |
| 2018/0018889 | A1 * | 1/2018 | Koutrika | ................ G06Q 30/02 |
| 2018/0197425 | A1 * | 7/2018 | Lamb | .................... A61B 5/6891 |
| 2018/0366014 | A1 * | 12/2018 | Nguyen | ................ G09B 5/065 |

(Continued)

*Primary Examiner* — Peter R Egloff

(57) ABSTRACT

The present invention relates to Smart E-Learning system using adaptive video lecture delivery based on attentiveness of the viewer. The attentiveness of the viewer is increased, who is watching a video lecture (204) in an E-learning scenario where viewer's attentiveness score (205) is captured based on facial expressions, cognitive responses etc. The video content (209) are changed dynamically to increase the attentiveness of the viewer in real time without viewer's knowledge. To change content segments, next segment predictor (206) has prior knowledge of the main video with its break points and supporting videos (207). It (206) uses viewer's attentiveness (210) and selects the next segment (209) which is played for the viewer, before proceeding with the main content. Incremental Learning with AI/MML techniques are used for next segment prediction. The feedback of attentiveness score after content segment change is used by the Next Segment Predictor (206) for further learning process.

5 Claims, 3 Drawing Sheets

Process of adaptive video lecture delivery

(56)    References Cited

U.S. PATENT DOCUMENTS

| | | | | |
|---|---|---|---|---|
| 2019/0212811 | A1* | 7/2019 | Moncomble ......... | A61B 5/4803 |
| 2020/0089317 | A1* | 3/2020 | Ghajar .................... | G06F 3/013 |
| 2020/0135045 | A1* | 4/2020 | Alyuz Civitci ...... | G06V 40/171 |
| 2020/0226941 | A1* | 7/2020 | Kakaraparthy ........ | G06N 20/00 |
| 2020/0265735 | A1* | 8/2020 | Byron ..................... | G09B 5/08 |
| 2020/0294408 | A1* | 9/2020 | Olivieri .................. | G09B 5/12 |

* cited by examiner

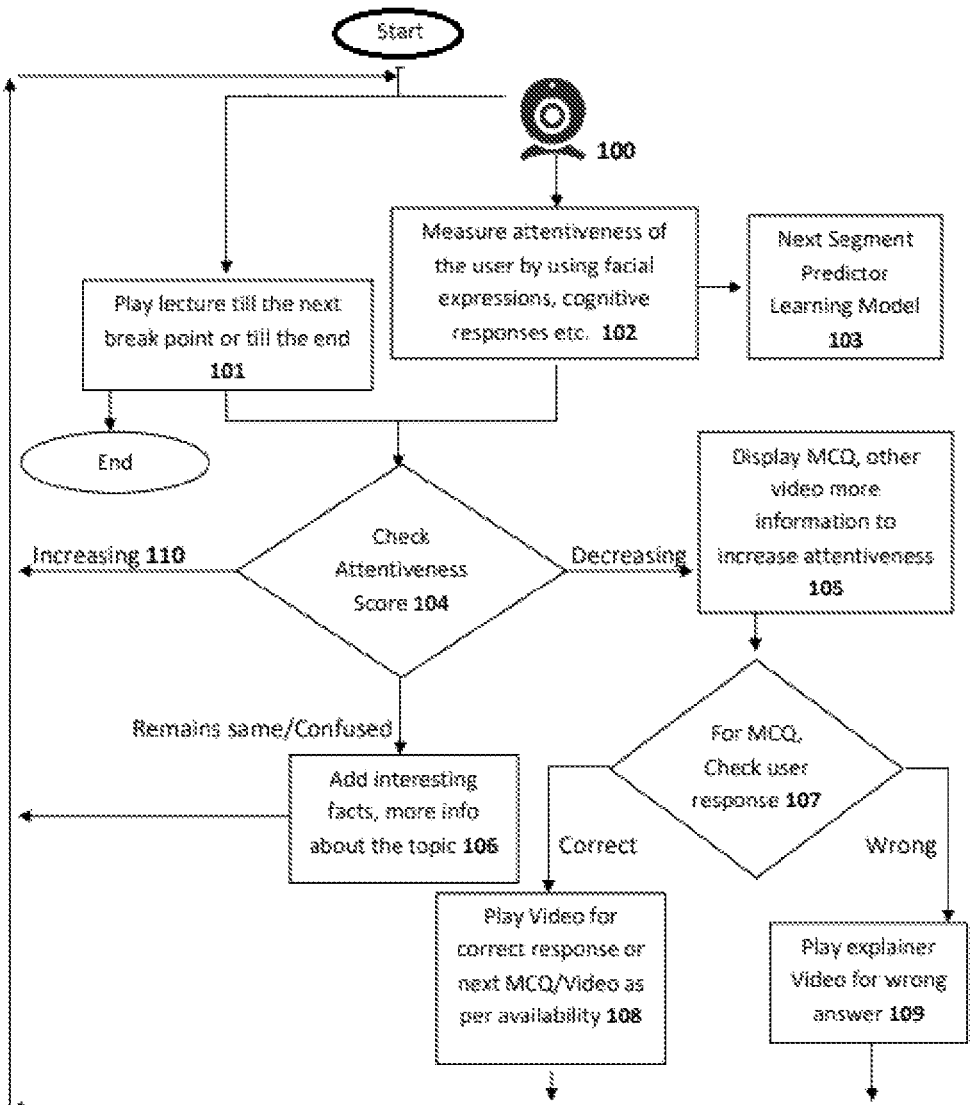
Figure 1: Process of adaptive video lecture delivery

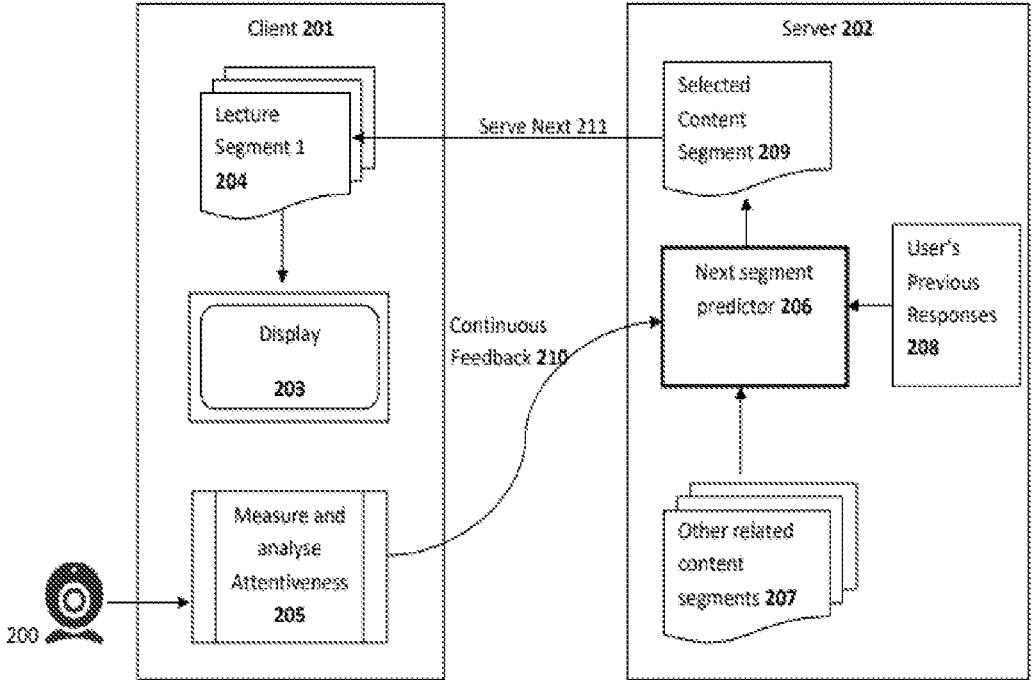
Figure 2: Smart E-learning system with adaptive video lecture delivery

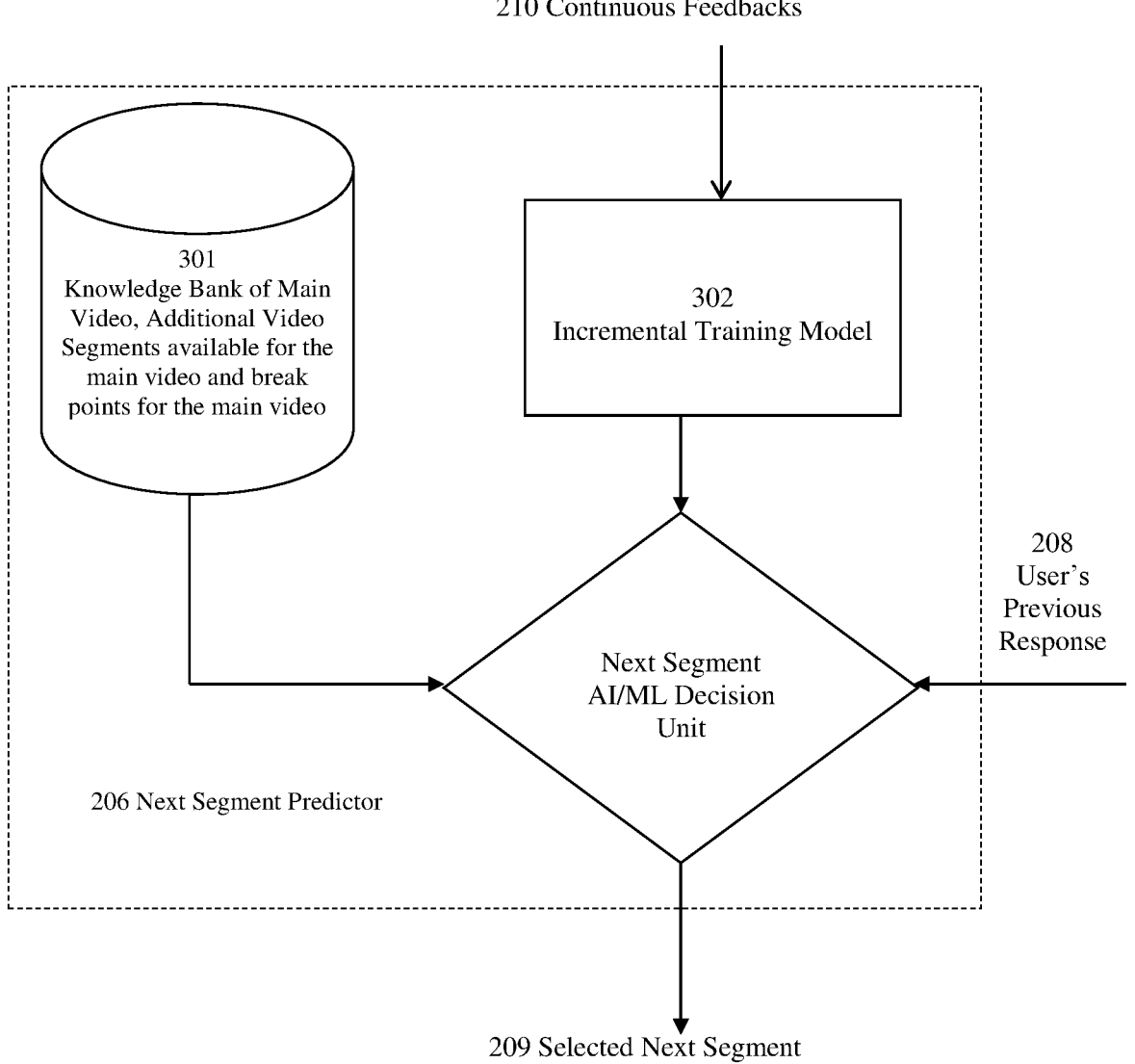
Figure 3: Next Segment Predictor Details

SMART E-LEARNING SYSTEM USING ADAPTIVE VIDEO LECTURE DELIVERY BASED ON ATTENTIVENESS OF THE VIEWER

TECHNICAL FIELD

The present invention generally relates to Smart E-Learning system using adaptive video lecture delivery based on attentiveness of the viewer. In particular, the present invention discloses method of learning the correlation between lecture contents and attentiveness of viewer using Artificial Intelligence (AI)/Machine Learning (ML) techniques and dynamically modifying the sequence of the video lecture elements in real time while the viewer is watching the lecture and system thereof.

BACKGROUND ART

With the growth of e-learning industry, there comes a need of making online lecture delivery more and more effective as well as personalized. Various computer algorithms are being used to make this possible. Any E-learning with pre-developed content consists one or more of reading materials, notes, MCQ (Multiple Choice Questions), assignments, projects and audio-video content to listen and watch. Various methods are being devised and used for personalizing this content. Personalization is in terms of what content to be displayed, when it is to be displayed, what should be the frequency of particular type of content.

To aid the personalization, various methods of collecting user's information are devised. This includes information about the user, including but not limited to, personal information, family background, content consumption rate, user's answers to MCQ, test marks, audio-video replays, time spent on each topic etc. Some methodologies of detecting faces for students' attendance or detecting attentiveness etc for students based on facial expressions while they are viewing the lectures are being ideated.

All these methods of personalization are used to pre-decide the content flow for a user. They fail to capture last minute cues or run-time mood/tendency of the viewer to adapt the content (video lecture) as and when the content is being viewed or consumed. Thus, they are of no use in increasing the attentiveness or grasping of the topic while the user is viewing the lecture content.

Moreover, some content is being inserted currently between the lectures. This is done in a pre-decided manner. If the attentiveness of the viewer is high, the new content that comes in may disturb him/her. And in turn reduce the effectiveness of the content/lecture. Hence these insertions have to be done tactfully. So, to make these online lectures effective we have designed the process of modifying the sequence of the online lecture elements in real time while the viewer is watching the lecture, based on attentiveness of the viewer using the facial expressions and other cognitive responses.

SUMMARY OF INVENTION

The present invention generally relates to smart E-learning system for effective lecture delivery. In particular, the present invention discloses method of learning the correlation between lecture contents and attentiveness of viewer using AI/ML techniques and dynamically modifying the sequence of the video lecture elements in real time while the viewer is watching the lecture to increase attentiveness of viewer and system thereof.

This invention is for the E-learning field. It aims to increase the attentiveness of the viewer in real-time while watching video lectures. This is done by capturing and analyzing the attentiveness of the viewer viz. facial expressions, cognitive response, while the user is watching the video lecture. This attentiveness level is analyzed and given as feedback to "Next Segment Predictor with AI/ML techniques" 206. To enable faster processing and get real-time results, this analysis process 205 is completely done on the client browser 201 using the Web Assembly (WASM).

In an embodiment, the Next Segment Predictor with AI/ML techniques 206 is a block that will predict the next segment of content 209 to be displayed to the viewer. The Next Segment Predictor block 206 is developed using incremental AI/ML techniques, whereas a model is incrementally trained with 210, 208, 207 the correlation between lecture content and attentiveness level of viewer. The next lecture segment 209 is recommended using this trained model 206 where this recommended lecture element 209 is added dynamically in online lecture 204 in order to increase attentiveness of viewer.

The Next Segment Predictor 206 runs on the server 202 and has all the information regarding the topic and the content that is being viewed by the user. It also has information about the user's previous attentiveness scores 208 based on facial expressions, cognitive responses etc. and their trends. Using this information, it is able to predict the next content segment 209 that should be presented to the particular user.

All this happens in real-time. And the user has no idea that the content he/she is watching is being customized for him/her and his/her temperament while watching the lectures. But it ultimately results in better attentiveness and hence better grasping of the topic in the video lecture.

An object of the present invention is to a. Increase the engagement of student viewing video lectures b. Perform attentiveness analysis of viewer in real time while the viewer is watching the lecture.

c. Decide the next segment of the ongoing lecture based on viewer's attentiveness analysis dynamically without a break and without letting the user know.

d. Predict the next lecture segment by incrementally learning correlation between attentiveness level of viewer and lecture content to train model using AI/ML techniques e. Perform smooth transit of the content delivery as is pre-recorded lecture which will suit the viewer's temperament f. Increase viewer's attentiveness and in turn increase the grasping of topics.

To further clarify advantages and features of the present invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention is described and explained with additional specificity and detail with the accompanying drawings.

Technical Problem

In the e-learning scenario, where users watch video lectures in order to learn a subject, the video lectures can get monotonous without any interactivity. Such interactivity is currently being introduced by adding segments similar to MCQ questions, interesting facts etc between the video lectures. But this addition is pre-fixed. The user responds to these segments by answering the question and proceeds further. Such activities may not be useful to each user to boost their concentration while watching the video lecture. Also since the sequence is pre-fixed, the video lecture continues as it is programmed without considering if the user has answered correctly or incorrectly. In such cases, these inserted segments may in turn reduce the concentration level and the user may not be able to grasp the concepts well.

Solution to Problem

In this solution, we consider that learning behavior for each user is different. The effectiveness of the lecture shall depend on the temperament of the user while watching the lecture. Hence this solution measures the attentiveness of the user, while he/she is watching the video lecture, using sensory inputs, facial expression recognition etc. Based on this input, Next Segment Predictor decides the next segment to be displayed to the user. Next Segment Predictor is a trained model that uses AI/ML techniques to select the next video segment that increase the attentiveness of the user.

Advantageous Effects of Invention

This solution gives personalized experience to each individual while watching the video lecture. It increases their ability to grasp the concepts from the video lecture more effectively. It also increases the engagement of the user with the video lecture content and hence gives better learning outcome.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein:

FIG. 1

FIG. 1 illustrates a process of adaptive video lecture delivery that is used to collect the training data for calculating attentiveness. Web cam or other sensory devise 100 is used to capture various facial expressions and cognitive responses of viewer 102. Parallely, the lecture is played till the end if attentiveness level is acceptable or till next break point 101. Measured attentiveness score 102 is sent to next segment predictor 103 for incrementally training the model using AI/ML techniques. Attentiveness score is checked 104 and if it is decreasing MCQs, other video or more information to increase attentiveness is displayed 105. If MCQ response is correct 107 video for correct response or next MCQ/Video as per availability is played 108 or if MCQ answer is wrong, explainer Video related to MCQ is played 109. If attentiveness score is same or confused interesting facts, more info about the topic is added 106. If attentiveness increases 110, process of playing the video continues;

FIG. 2

FIG. 2 depicts the complete smart E-Learning system with adaptive video lecture delivery in form of Client-Server (201-202) architecture. Attentiveness of the viewer are detected from client side (201) while playing the lecture segment (204) using facial expressions, cognitive responses etc. using hardware devices like webcam (200) or other sensory inputs. These expressions are analyzed (205). This analysis is continuously sent to server (210). The Server (202) finds new content segment (209) using the "Next segment Predictor" (206) that uses incremental training AI/ML Technique. It is trained using process shown in FIG. 1 but refines the results based on the continuous feedback (210) on the prediction that it receives. Previously stored user responses (208) and other content related to the topic (207) being viewed by viewer are also used in the prediction process. The Next Segment Predictor (206) decides the final content segments (209) that needs to be inserted and sends it to the client. The client (201) modifies the video sequence (204) in run-time. As soon as the current segment is completed, new segment (209) received from the server is first served before proceeding with its pre-decided lecture sequence.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

FIG. 3

FIG. 3 illustrates the Next Segment Predictor (206) in detail. The next segment predictor comprises of Knowledge Bank (301), Incremental Training model (302) and a decision unit (303). Knowledge Bank (301) has all the knowledge about, i) the main video that the viewer is watching
    ii) time position at which this video can be stopped to insert new videos i.e. break points
    iii) Supporting videos, content segments available to be inserted at each break point.

Viewer's attentiveness is received by the Incremental Training Model (302) continuously while the viewer is watching the content in the form of feedback loop. This feedback is used for incrementally learning the impact of changes made to the video content by the decision unit (303) by inserting or not inserting new segments.

The attentiveness received from the viewer triggers the decision unit (303) to check if any insertions are to be made to the main video to maintain the viewer's attention and interest levels in the content to aid grasping more knowledge. If decision unit (303) decides to insert a new supporting video, such video is sent to the client (202) to be displayed to the viewer.

DESCRIPTION OF EMBODIMENTS

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are exemplary and explanatory of the invention and are not intended to be restrictive thereof.

Reference throughout this specification to "an aspect", "another aspect" or similar language means that a particular feature, structure, or characteristic described in connection with the embodiment is included in at least one embodiment of the present invention. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which this invention belongs. The system, methods, and examples provided herein are illustrative only and not intended to be limiting.

Embodiments of the present invention will be described below in detail with reference to the accompanying drawings.

In an E-learning scenario, when a user is watching the video content/lecture, the user may not be in a temperament to grasp too much information. In this case, the effectiveness of the video content/lecture is not fully achieved. Hence, it is important to first grab the attention of the listener. In real life scenario with physical delivery of lectures, the lecturer uses the cues from facial expression of the listener to modify the lecture sequence. With our invention we are trying to replicate this scenario even in e-learning environment with no human intervention.

Complete process involves of three mains steps:

1) Attentiveness Detection and Analysis

This is the first step in the process and is performed while the user is watching the video content. Viewer's attentiveness level is detected based on various parameters like facial expressions, cognitive response mapped based on, but not limited to, eye movement, eye aspect ratio, lip movement, forehead expression etc. These are then compared with a pre-trained model of attentiveness detection. This can be done on the client side 201 or on the server-side 202. We do this on the client side. The trained model of attentiveness detection 205 is combined with the AI/ML technology into a docker. WebAssembly (WASM) is used on the client browser to run this docker. Since this detection are done at the client machine, it saves the huge load of 1) Transferring images/video sequence captured to the server 2) Processing huge amount of data on the server received from each and every student.

Since content segments and its sequence are changed dynamically in real time, such technology will provide the desired results as fast as possible. The final attentiveness level score is then sent to the server.

2) Calculating Change in Video Content Sequence

The server 202 once received the attentiveness score as continuous feedback 210. The server 202 uses the steps of process shown in FIG. 1 to find if there should be any change in the content sequence.

For this the server 202 already has pre-loaded information 207 about the current topic of the content/lecture. This information consists of a main content video. This main content video is marked for break points. These break points are marked smartly by the content creator using an authoring tool wherein the authoring tool has facility to upload the predicted content video with the facility to mark the break point timing in the main content video; each main content video is accompanied by several supporting content segments wherein these segments may consist of, but not limited to, explanatory video with more examples, MCQ along with their explanatory videos or correct as well as wrong response from the user, solution of certain extra questions, points to remember etc.; each supporting segment is classified into different content type.

The smart decision of what content type should be selected for what kind of attentiveness trend is derived from incremental training model developed with AI/ML technique. For this the viewer's feedback in terms of attentiveness level for the newly inserted content segment 209 is observed. The change in attentiveness is stored for future reference. This data is then fed to the next segment predictor 206 to calculate if sending a particular content segment is desirable or not.

Once this decision is made, new content segments are selected and sent to the client. This process can also be run on the client side. In this case client is preloaded with all the information about the content segments available for insertion.

3) Changing the Sequence in Real Time

The new content segments 209 to be inserted are received on the client side 211. As soon as the next break point is hit the new content segments are played. This happens without any notification to the viewer/user. For the user it seems to be a pre-decided sequence but in real it has been modified to suit the temperament of the user/viewer.

Using this invention, the E-learning system can be made more effective. The grasping of the topic will be facilitated for the user/viewer. Every time the user watches the same topic, he may be presented with a new set of content sequence based on its attentiveness.

FIG. 1 shows a process of adaptive video lecture delivery that is used to collect the training data where each lecture is divided into various segments using break points. Following steps are depicted in the said process:

1) While the video segment is playing (101), attentiveness of the viewer is measured using facial expressions, cognitive responses etc. in parallel (102) using the web-camera (100) or any other sensory inputs.

2) The attentive score is analyzed (104)

3) If the viewer is a. Not attentive or attentiveness is decreasing: MCQ or some interesting video segment is presented to him related to the topic (105).

i. Response for MCQ is recorded (107), if the response is incorrect, an explainer video is played to explain the correct answer (109).

ii. If MCQ is answered correctly, next MCQ/video is played as per availability (108)

b. Attentive, increasing attentiveness: no changes are done here (110).

c. Confused, attentiveness remains same: Interesting fact, re-explanation of video with more examples is shown (106).

4) After the new content segment/MCQ/Video insertion is played as in point 3 (106,108,109,110), the next video segment in the lecture is played by repeating point 1 in this process (101).

5) The facial expression and attentiveness trend is again captured here and sent to the learning model (103) as an ongoing process. This data is stored and will be used as a reference point to mature the process that will actually be used for predicting the next content segment.

FIG. 2 illustrates the complete smart E-Learning system with adaptive video lecture delivery in form of Client-Server (201-202) architecture. Attentiveness of the viewer are detected from client side (201) while playing the lecture segment (204) using facial expressions, cognitive responses etc. using hardware devices like webcam (200) or other sensory inputs. These expressions are analyzed (205).

This analysis is continuously sent to server (210). The Server (202) finds new content segment (209) using the "Next segment Predictor" (206) that uses incremental training AI/ML Technique. It is trained using process shown in FIG. 1 but refines the results based on the continuous feedback (210) on the prediction that it receives. Previously stored user responses (208) and other content related to the topic (207) being viewed by viewer are also used in the prediction process.

The Next Segment Predictor (206) decides the final content segments (209) that needs to be inserted and sends it to the client. The client (201) modifies the video sequence (204) in run-time. As soon as the current segment is completed, new segment (209) received from the server is first served before proceeding with its pre-decided lecture sequence.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

EXAMPLES

Example 1

Example 1 describes an event where user is viewing a lecture online and is not attentive. Low attentiveness is detected by this system and next segment predictor is notified accordingly. Next segment predictor takes action to insert a question or an interesting fact based on its previous knowledge about the content. Here interaction is introduced at the right time to increase the attentiveness of the user. User is now engaged in answering the question. Based on whether user answers correctly or incorrectly, the next segment predictor brings in the correct explanation of the question with few more details. Now attentiveness is measured. If the attentiveness score is increased, next segment predictor does not insert new segment and main video continues to play. If attentiveness is still not up to the mark, next segment predictor will find other content segment for current or next break point. This process continues trying to keep good level of attentiveness from the user.

Example 2

Example 2 describes an event where user id watching the lecture before the exam to revise the concepts. The user is very attentive here. Hence the next segment predictor does introduce additional segments like questions, extra information etc. to keep the attentiveness intact. This also helps the user to revise the main concepts quickly. Here the content creator takes no extra efforts for such revision lectures separately. The given system handles different scenario based on the attentiveness feedback that it receives from the user

INDUSTRIAL APPLICABILITY

In the process of learning online, interactivity is limited due to lack of feedback loop from the user. Hence it is not as effective as the physical classroom learning. This invention can be used by universities and online self-paced learning platforms to enhance the effectiveness of their online learning content. This invention will bring online self-paced learning to be at par with the offline (one-on-one) learning experience. Using this invention will give personalized learning experience to users and hence they will prefer this mode of learning. This will ultimately lead to increase in number of users learning online and will benefit the online learning industry. For online learning, there will be no limit on number of students that can be admitted to a course at a given time. This will benefit the universities without losing the effectiveness of the course content.

CITATION LIST

Citation List follows:

PATENT LITERATURE

PTL 1 discloses the invention of dynamic and adaptive eLearning system for improvement of the productivity of learners and smart attendance monitoring through appropriate interaction and feedback. Particularly this invention is for taking attendance using face recognition and attentiveness detection. It is sent as a feedback but not used anywhere in order to modify the online lecture. Whereas, in our invention this feedback is used for modifying video sequence of pre-recorded lectures.

PTL 2 discloses the real-time portable tele-education method based on cognitive load and learning style from BCI data using CI based techniques and content services. It uses BCI, EEG and brain wave detection to calculate cognitive load of learners and adapts courseware that includes lessons, tasks etc. in runtime. However, it does not focus on dynamic sequencing of learning video lectures. Also, camera feed is not used here for attentiveness detection.

PTL 3 discloses system and method for automated course individualization via learning behaviors and natural language processing. In this invention, content is tagged using NLP and then the most relevant content path for the user from the available content is found. This path is changed at regular intervals like module completion. Moreover, facial expressions, cues or attentive level is not used to detect the learner's response for adaptive real time video content delivery.

PTL 4 discloses invention about personalized and adaptive math learning system. The scope of the invention limits to teaching only maths subject. The invention does not make use of camera feed from students. However, the system makes use of background information of students to create learner's profile. Lesson plans are adapted accordingly. Changing the sequence of video or live lectures are not mentioned anywhere in the said invention.

PTL 1: Patent IN202031055451
PTL 2: Patent IN202031055111
PTL 3: Patent US20160314699
PTL 4: Patent US20200258420

Non Patent Literature

NPL 1 refers to adaptive video learning by the interactive e-Partner. Here, to motivate students and grab their attention, the interactive e-partner is introduced into the lecture videos. The e-partner's behavior would evolve and animate with the student's learning style and the lecturer's teaching behavior, so that students can be encouraged to focus on the lecture content and enjoy the self-paced learning at the same time. The invention doesn't speak about change in video lecture.

NPL 2 relate to supporting online lectures with adaptive and intelligent features. Authors present different pedagogical aspects for recommending the most suitable learning materials for students based on their learning profiles and preferences, involving students in the learning process from the very early beginning of the lecture, and preparing for the next/upcoming lecture, so students feel the personalization and customization of the lecture to enhance the learning process and students' online learning experience. However, the sequence of lecture content remains pre-decided and fixed for particular student.

NPL1: Chia-Hu Chang et. al, "Adaptive Video Learning by the Interactive e-Partner", in 2010 IEEE International Conference on Digital Game and Intelligent Toy Enhanced Learning, DOI: 10.1109/DIGITEL.2010.54

NPL2: A. M. Riad, Hamdy K. El-Minir, Hazem M. El-Bakry, Haitham A. El-Ghareeb, "Supporting Online Lectures with Adaptive and Intelligent Features", in Advances on Information Sciences and Service Sciences. Volume 3, Number 1, February 2011

I claim:

1. A Smart E-Learning system configured for adaptive video lecture delivery based on a real-time attentiveness level of a viewer, the system comprising:
   a. an input device (200) comprising a webcam or other sensory input configured to capture facial expressions and cognitive response parameters of the viewer;
   b. a client machine (201) configured as a user console, the client machine (201) comprising:

a display (203) configured to play video lecture content comprising a main content video and a plurality of supporting content segments (204);
   an attentiveness detection module (205) comprising a trained artificial intelligence or machine learning model configured to measure and analyze the captured facial expressions and cognitive response parameters to generate a continuous attentiveness score (210) of the viewer during playback of the video lecture content, wherein the model is implemented in a docker and wherein WebAssembly is used on the client machine to run the docker;
   c. a server machine (202) configured as a backend processing unit, the server machine comprising:
   a content repository storing the main content video and the plurality of supporting content segments, each supporting content segment classified by type and configured to be inserted at pre-defined breakpoints in the main content video, wherein the breakpoints are pre-marked by a content creator using an authoring tool;
   a next segment predictor module (206) comprising an incremental training machine learning model configured to:
      receive the continuous attentiveness score (210) from the client machine (201) as continuous feedback;
      determine, based on correlations between the attentiveness score, the current playback segment, and historical viewer responses (208), whether to insert a supporting content segment at a next breakpoint; and
      select a specific supporting content segment (209) from the content repository for adaptive insertion into the main content video in real-time;
   wherein the server machine (202) transmits the selected supporting content segment (209) to the client machine (201) for playback such that the viewer perceives a seamless, continuous video without being notified of any insertion, thereby dynamically modifying the video lecture in real time to maintain or improve the attentiveness level of the viewer.

2. The system of claim 1, wherein the attentiveness level is detected based on facial expressions and cognitive response parameters including at least one of: eye movement, eye aspect ratio, lip movement, or forehead expression.

3. The system of claim 1, wherein the next segment predictor module (206) is further configured to:
   monitor changes in the attentiveness score (210) after a selected supporting content segment (209) has been played;
   store the monitored changes as historical data (208);
   update its machine learning model incrementally using the historical data to improve prediction accuracy for future content selections.

4. The system of claim 1, wherein the client machine (201) is preloaded with information about available supporting content segments and breakpoints, enabling local insertion of content segments without additional user interaction, such that the adaptive modification of video playback occurs without interruption to the viewer experience.

5. A method for adaptive delivery of video lecture content to a viewer using the system of claim 1, the method comprising steps of:

capturing facial expressions and cognitive response parameters of the viewer using the input device (200) while a main content video is playing on the client machine (201);

generating the continuous attentiveness score (210) using the attentiveness detection module (205);

transmitting the continuous attentiveness score (210) to the server machine (202);

analyzing the continuous attentiveness score (210) using the next segment predictor module (206) to:

determine whether a supporting content segment should be inserted at a next predefined breakpoint in the main content video;

select a specific supporting content segment (209) based on attentiveness trends and historical data (208);

transmitting the selected supporting content segment (209) to the client machine (201);

automatically inserting and playing the supporting content segment (209) at the next breakpoint in real-time without notifying the viewer, such that the main content video appears as a single, seamless video stream;

continuously monitoring attentiveness trends and incrementally updating the next segment predictor module (206) to improve future content selection.

\* \* \* \* \*